United States Patent [19]

Reick

[11] Patent Number: 4,465,058
[45] Date of Patent: Aug. 14, 1984

[54] SOLAR ENERGY AIR-HEATING SYSTEM
[75] Inventor: Franklin G. Reick, Westwood, N.J.
[73] Assignee: Michael Ebert, Mamaroneck, N.Y.
[21] Appl. No.: 396,672
[22] Filed: Jul. 9, 1982
[51] Int. Cl.³ ............................................. F24J 3/02
[52] U.S. Cl. .................................. 126/429; 126/444; 126/450; 126/431
[58] Field of Search ............... 126/429, 431, 450, 417, 126/444, 449

[56] References Cited

U.S. PATENT DOCUMENTS

| | | | |
|---|---|---|---|
| 3,875,925 | 4/1975 | Johnston | 126/429 X |
| 3,996,918 | 12/1976 | Quick | 126/450 X |
| 4,026,268 | 5/1977 | Bartos et al. | 126/450 X |
| 4,062,347 | 12/1977 | Jensen | 126/431 |
| 4,072,141 | 2/1978 | Fillios et al. | 126/429 X |
| 4,080,955 | 3/1978 | Sandstrom | 126/444 |
| 4,154,224 | 5/1979 | Ferriera | 126/450 |
| 4,265,221 | 5/1981 | Whinnery | 126/429 X |
| 4,284,064 | 8/1981 | Midouhas | 126/429 |
| 4,300,532 | 11/1981 | Olsen | 126/429 X |
| 4,304,220 | 12/1981 | Brockhaus | 126/429 |
| 4,324,231 | 4/1982 | Reinert | 126/429 X |

Primary Examiner—Larry Jones
Attorney, Agent, or Firm—Michael Ebert

[57] ABSTRACT

A solar energy air-heating system readily installable on the exterior wall of a residence or other building, the system including a module constituted by a slab of rigid foam plastic thermal insulation material whose upper face is covered by a fibrous mat having a blackened surface to absorb solar energy. Each edge of the slab is secured to a molding also adapted to receive the corresponding edge of a flexible transparent panel whose width is greater than that of the slab, so that when the panel is bridged between the edge moldings, it forms an arched dome over the slab. By attaching a series of such modules in end-to-end relation vertically along the wall of the building, an air duct is created whose lower end is then coupled by an inlet fixture to a lower zone in the interior of the building and whose upper end is coupled by an outlet fixture to an upper zone in the interior, a flow loop being thereby formed between the duct and the interior. Because of the pressure differential developed between the upper and lower zones, air is drawn into the inlet, the air being heated in the course of its passage through the duct by heat transfer from the blackened surface. The heated air is discharged from the outlet to heat the interior.

12 Claims, 6 Drawing Figures

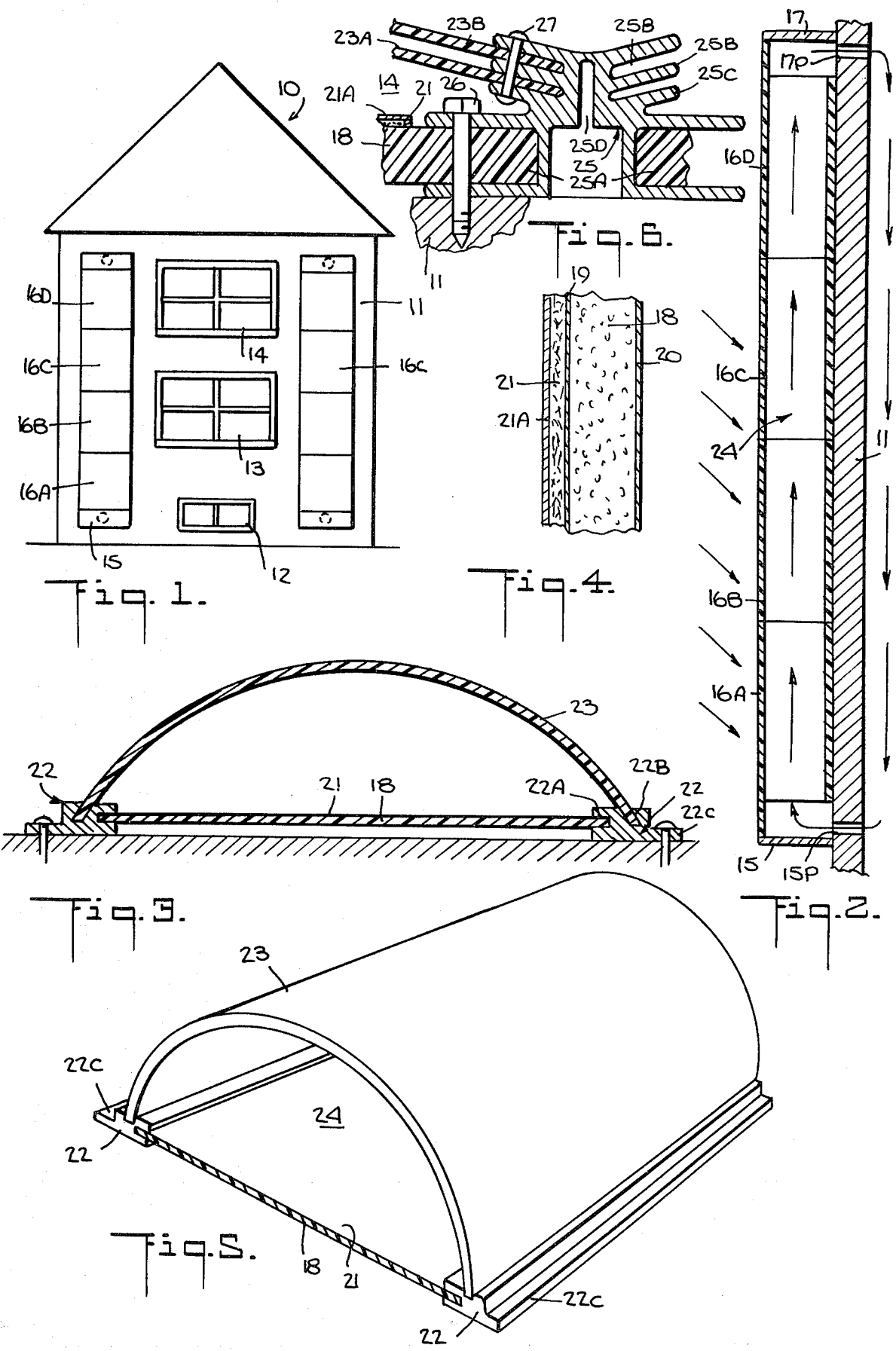

SOLAR ENERGY AIR-HEATING SYSTEM

BACKGROUND OF INVENTION

This invention relates generally to heliothermal systems, and in particular to a solar-energy air-heating system which makes use of collector modules that are readily attachable to the exterior wall of a building to create a solar collector unit which forms an air flow loop with the building interior whereby air drawn from the interior is heated in the course of its passage through the unit before being returned to the interior.

With the growing scarcity of fossil fuels and their sharply rising cost, a pressing need exists for an inexpensive and abundant energy source. The inexhaustible nature of solar energy and its significant magnitude over relatively small collection areas is such as to encourage its exploitation, even at low efficiencies of recovery. Despite variations encountered in solar radiation in the course of a day, this energy can be used in a heliothermal process in which the incident radiation is absorbed and converted into heat for heating air or water to moderate temperature levels.

In considering a heliothermal system, one must draw a distinction between economic and operating efficiency. The operating efficiency of any thermal energy conversion system, including a solar energy collector, is determined by the ratio of heat obtainable to useful heat received. But economic efficiency is measured by heat units obtainable in a unit time per dollar invested. Because low-level, free energy is available in great abundance within a relatively small area, one may tolerate a low operating efficiency if the system is inexpensive. The desideratum, therefore, is a system of the lowest possible cost and of the highest possible efficiency. In evaluating the comparative efficiency of solar energy systems, the most practical system is the one that generates the greatest useful energy output per dollar invested.

Typically, a solar-energy water-heating system includes a collector having water-filled tubes fastened to a heat-conductive plate, usually of blackened copper, as well as piping to connect the collector to a storage tank and a pump to circulate the water. The construction and installation costs of a solar-energy water-heating system are substantial, to say nothing of maintenance and other problems associated with such systems, such as water freezing in the pipes or leakage therefrom.

As pointed out in the May 1982 issue of *Consumer Reports* in an article entitled "Solar Water Heaters," though heaters of this type save energy, they do not actually save money; for the equipment and installation costs, unless heavily subsidized, are still too high to make a return in the form of energy savings, attractive.

An alternative approach to solar heating obviating the need for circulating water is to provide a solar-heat collecting panel in which heat absorbed by the collector surface exposed to solar radiation is transferred to air passing across the surface, the heated air being then used to heat the interior of a building provided with a conventional forced air heating system. Among patents which disclose solar heated air systems are patents to Parker, U.S. Pat. No. 3,919,998; Pulver, U.S. Pat. No. 3,994,276; and Keyes et al., U.S. Pat. Nos. 3,946,730 and 3,946,721.

An important advantage of a solar heated-air system over a solar water system is the absence of pipes in the collector and in the water lines connected thereto. This makes possible a significant reduction in construction, installation and maintenance costs. However, as will be evident from the above-identified patents, with existing solar air-heating collectors, it is still necessary to construct the collector so that its dimensions are appropriate to the siding or roof of the building on which it is to be installed. This means that the collectors have to be custom designed at the factory for a particular building or constructed at the building site, either procedure being relatively costly and requiring skilled craftsmen. In the case of the Keyes et al. arrangement, the solar collector is not installed on the building but occupies a separate cabin distinct from the building, a still more expensive arrangement.

Because of high labor costs and the scarcity of skilled craftsmen in the United States, many householders have become do-it-yourselfers. And for that reason, hardware stores and other establishments catering to home owners carry various products in knock-down form adapted to be assembled and installed by the householder using screw drivers and other simple tools. But the inherent nature of solar energy systems of the hot air or water type has heretofore been such that the system does not lend itself to packaging and transportation in knock-down form, or for installation by a do-it-yourselver having minimal skills.

SUMMARY OF INVENTION

In view of the foregoing, the main object of this invention is to provide a solar-energy air-heating system which includes a series of modules readily attachable to an exterior wall of a building to create a solar collector unit forming an air flow loop with the building interior, whereby air drawn from the interior is heated in the course of its passage through the unit before being returned.

A significant advantage of a system in accordance with the invention is that it exploits the pressure differential developed between upper and lower zones of the building interior whereby air is caused to flow naturally through the unit without the need for air pumps, propellers or other forced convection expedients.

Also an object of the invention is to provide modules which may be assembled in a manner appropriate to the layout of the building, so that the number of modules used is adjusted accordingly.

Yet another object of the invention is to provide modules which may be shipped and stored in a knock-down state and erected at the site by a do-it-yourselfer having minimal skills.

Still another object of the invention is to provide a system of the above type which may be constructed and installed at exceptionally low cost, the system having a relatively high operating efficiency.

A salient feature of the invention is that, unlike conventional solar heating collectors, a collector in accordance with the invention is not only relatively inconspicuous when installed, and does not detract from the appearance of the residence or building; but it can, when necessary, be detached from the wall of the building without any difficulty.

Briefly stated, these objects are attained in a solar energy air-heating system readily installable on the exterior wall of a residence or other building, the system including a module constituted by a slab of rigid foam palstic thermal insulation material whose upper face is covered by a fibrous mat having a blackened surface to absorb solar energy. Each edge of the slab is secured to a molding also adapted to receive the corresponding edge of a flexible transparent panel whose width is greater than that of the slab, so that when the panel is bridged between the edge moldings, it forms an arched dome over the slab. By attaching a series of such modules in end-to-end relation vertically along the wall of the building, an air duct is created whose lower end is then coupled by an inlet fixture to a lower zone in the interior of the building and whose upper end is coupled by an outlet fixture to an upper zone in the interior, a flow loop being thereby formed between the duct and the interior. Because of the pressure differential developed between the upper and lower zones, air is drawn into the inlet, the air being heated in the course of its passage through the duct by heat transfer from the blackened surface. The heated air is discharged from the outlet to heat the interior.

OUTLINE OF DRAWINGS

For a better understanding of the invention as well as other objects and further features thereof, reference is made to the following detailed description to be read in conjunction with the accompanying drawings, wherein:

FIG. 1 illustrates a building having a solar collector in accordance with the invention installed therein;

FIG. 2 shows in longitudinal section the collector against the exterior wall of the building;

FIG. 3 is a transverse section taken through one of the collector modules;

FIG. 4 is a section taken through the slab included in the module

FIG. 5 is a perspective view of the module; and

FIG. 6 is a modified form of molding. cl DESCRIPTION OF INVENTION

The Structure of The System:

Referring now to FIG. 1, there is shown a private residence or building having a solar-energy air-heating system in accordance with the invention installed therein. The building 10 has a basement provided on exterior wall 11 with a window 12, a first story having a window 13 and a second story having a window 14, the windows being one above the other along the center of wall 11.

Mounted vertically on the wall on either side of the windows are identical collector units each composed of an inlet fixture or header 15, a series of four identical modules 16A, 16B, 16C and 16D in end-to-end relation and an outlet header 17. This arrangement is only by way of illustration, for the number of modules in the collector depends on the available wall space in a given building. Thus the wall in some instances may have only a single collector unit thereon composed of six modules, or it may have three units, one with three modules and the other two with five modules each. The nature of the modules is such that one can take advantage of whatever wall space is available.

Each module, as illustrated in FIGS. 3 to 5, is composed of a slab 18 of rigid foam plastic material preferably constituted by fire-resistant, rigid polyurethane foam whose upper and lower faces have aluminum foils 19 and 20 laminated thereto to provide a structural laminate of good strength and excellent thermal insulating properties. In practice, the facing skins which rigidify the structure may be of other materials such as fiberglass sheets.

Adhered to the upper face of foils 19 is a mat 21 of non-woven synthetic fibers whose exposed face 21A is blackened, such as with a jet black latex paint. The fibers are preferably of aluminum silicate or other non-burnable refractory material having an affinity for paint. While other fibers can be used, unless they are fire resistant they may not satisfy the fire codes in certain communities. Thus Dacron is not acceptable in this respect.

The opposing edges of the slab are secured to edge moldings 22, as shown in FIG. 3. The molding, which may be made of a metal or plastic extrusion, such as aluminum or polypropylene, is provided with a main horizontally-extending channel 22A adapted to accommodate and clamp onto the edge of the slab. The molding also includes an inclined channel 22B adapted to accommodate and clamp onto the edge of a transparent plastic panel 23. The length of panel 23 is the same as that of slab 18, but its width is greater so that when the panel, which is preferably made of fiberglass and is therefore non-flammable, is bridged between moldings 22, it forms an arched dome over slab 18 to provide an air passage. In practice, the molding channels may be provided with apertures to receive pins and other means to lock the slab and the panel thereto.

The moldings are also provided with a flange 22C having holes therein to receive nails, screws or anchor bolts for attaching the module to the wall. When a series of modules are attached to the wall one above the other, as shown in FIG. 2 with their arched panels in registration, a duct 24 is created thereby, as shown in FIG. 2, which runs from the lowermost module 16A to the uppermost module 16D. To avoid air leakage the junctions of the modules may be taped.

The lower end of this duct is enclosed by lower header 15 having an inlet port 15P aligned with an opening in wall 11 leading into a lower interior zone in the building which, in the example shown, lies in the basement. The upper end of this duct is enclosed by upper header 17 having an outlet port 17P aligned with an opening in wall 11 leading into an upper interior zone in the building which, in the example shown, is in the second story thereof. In practice, these headers may take the form of caps which telescope over the ends of the modules and have a flexible hose extending therefrom for insertion in an opening in the wall of the building.

Operation

Sunlight impinging on the unit will pass through the transparent dome and strike the blackened surface of mat 21, the solar energy being absorbed thereby. The dome provides a greenhouse effect to minimize the loss of heat from the module. As a consequence of natural convection, air in the upper interior zone of the building is warmer than that in the lower zone thereof. Because inlet 15P of the unit is coupled to the lower zone and outlet 17P to the upper zone, the resultant pressure differential developed therebetween causes the relatively cool air from the lower zone to be drawn into the inlet and to flow upwardly through duct 24, in the course of which heat is transferred to the air. The air discharged from the outlet is therefore at an elevated temperature which in practice may be 150° F. or higher, depending on the prevailing sunlight.

Because in the typical home, the upper zone is not isolated from the lower zone and air can flow therebetween, a continuous flow loop is formed between the collector unit and the interior, and heated air generated by the unit is circulated throughout the interior. Obviously, in the absence of sunlight or at night, no air heating takes place; and it order to avoid feeding cold air into the interior, the inlet and outlet ports in the building are provided with suitable dampers to shut off air flow or to adjust the amount of air passing through the collector unit.

The aluminum foil on the upper face of the slab serves to reflect infrared rays and to thereby enhance the transfer of heat to the air flowing over the slab. The aluminum foil on the lower face functions as a moisture barrier. The foils also, as previously explained, create in conjunction with the foam plastic core a structural laminate of light weight and good strength. The thermal insulation provided by the foam slab significantly reduces the loss of heat from the collector unit so that it operates at high efficiency.

In practice, the modules may be factory-produced with the moldings attached to the slabs, and with the transparent panels in the flat state, so that all components of the modules may be shipped and stored in a knock-down condition. All the purchaser has to do to complete the three-dimensional module is to insert the panels in their molding channels, and to then attach the module to the side of the building.

While there has been shown and described a preferred embodiment of a solar energy air-heating system in accordance with the invention, it will be appreciated that many changes and modifications may be made therein without, however, departing from the essential spirit thereof. Thus a collector unit may be formed by a single, relatively long module rather than by a series of identical short modules. And instead of having an arched transparent panel, the thermal insulation on which the blackened mat is placed may assume the form of a channel-shaped trough covered by a flat transparent panel.

Modifications

Referring now to FIG. 6, there is shown a twin molding 25 for creating modules suitable for cold climates. The modules, in this instance, have a double-glazing formed by overlying arched transparent panels 23A and 23B, the spacing therebetween defining a dead air space affording good thermal insulation. For this purpose, upper panel 23B is slightly wider than lower panel 23A. The panels may be fabricated of a polycarbonate material of high strength.

Twin molding 25 is preferably extruded from a material capable of withstanding long-term outdoor exposure under extreme climatic conditions. It may be made of a cross-linkable polyethylene, PVC or polysulfone. Also, the molding may be extruded from aluminum. Molding 25 is double-sided and has a pair of outwardly extending horizontal channels 25A dimensioned to accommodate the margins of slab 18. In practice, instead of covering slab 18 with a non-woven fibrous mat whose surface is blackened, use may be made for this purpose of a metal wire mesh or mat whose surface is blackened. Screws or bolts 26 which go through channel 25A and penetrate the margin of slab 18 act to secure the module to wall 11 of the building.

Also formed in twin molding 25 are upper and lower pairs of inclined channels 25B and 25C (i.e., 15°) adapted to receive the edges of the glazing panels. These are held in place in the channels by pop rivets 27.

With this arrangement, one can set up a pair of passive solar collector modules in side-by-side relation on the wall of an edifice, the twin molding 25 being common to and lying intermediate the pair. The outside moldings for the pair of modules are single moldings. These can be provided by cutting twin molding 25 in half through the center slot 25D, thus making it unnecessary to separately extrude single moldings.

While the moldings are shown in conjunction with a solar collector in which an air duct is defined between the arched glazing and the slab, in practice the moldings may be used for support glazing to create a low-cost and efficient greenhouse. In this case, a greenhouse frame is erected using metal or wood strips of a thickness which can be accommodated in the horizontal channels 25A.

It is to be noted that the invention is shown as preferably mounted on the vertical side of the building, rather than on an inclined roof, which is the usual practice. The reason for this is that since the solar heating system acts to heat the house interior, it is not normally intended for use in the summer when the angle of sun rays is high. In the winter when the sun angle is low, this angle is more effective with a vertically-mounted collector; hence this mounting has practical advantages. However, one can use the collector in the summer by feeding the heated air into a heat exchanger to raise the temperature of household water for washing purposes.

It has also been found that the radius of curvature of the panel overlying the slab in the module should be relatively low to provide a shallow rather than a steep dome; for too great a radius of curvature tends to impart optical properties to the dome and to focus the solar rays rather than distribute them over the entire surface of the heat collecting mat.

I claim:
1. A solar-energy air-heating system installable on an exterior wall of a building to heat the air in the interior thereof, said system comprising:
(A) a plurality of open-ended, like modules attachable to said wall in a vertical series arrangement therein to define a series of interconnected air ducts, the number of modules in the series depending on the height of the building, each module being formed by a slab of rigid thermal insulation material having a predetermined length and width, the upper face of the slab being covered by a mat having a blackened surface to absorb solar energy, and a panel of flexible transparent plastic material having the same length as said slab and a greater width, the edges of said slab being secured to the corresponding edges of the panel by a molding provided with a mounting flange to permit attachment thereof to said wall, whereby the panel forms an arched dome over the slab to create an air duct in which air passing therethrough is heated by heat transferred thereto from the mat;
(B) an inlet header coupled to the open end of the lowermost module in the series and communicating through an opening in said wall with a lower interior zone in said building; and
(C) an outlet header coupled to the open end of the uppermost module in the series and communicating through an opening in said wall with an upper interior zone in said building, whereby the pressure differential developed between the inlet and outlet causes air from the lower zone to be drawn into said series of air ducts and to pass therethrough to be heated before being discharged into said upper zone.

2. A system as set forth in claim 1, wherein said slab is of foam plastic material.

3. A system as set forth in claim 2, wherein said material is of fire-resistant polyurethane foam.

4. A system as set forth in claim 2, wherein said slab has metal foil facings to form a structural laminate.

5. A system as set forth in claim 1, wherein said panel is of fiberglass.

6. A system as set forth in claim 1, wherein said panel is of polycarbonate.

7. A system as set forth in claim 1, wherein said mat is formed of non-woven fibers.

8. A system as set forth in claim 7, wherein said fibers are formed of refractory material.

9. A system as set forth in claim 1, wherein said mat is formed of a wire mesh.

10. A system as set forth in claim 1, wherein said molding has a horizontal channel to receive the edge of the slab and an inclined channel to receive the edge of the panel.

11. A system as set forth in claim 10, wherein said molding includes a second inclined channel to receive the edge of a second panel to create a double glazing.

12. A system as set forth in claim 11, wherein said molding is in a twin formation to create pairs of channels.

* * * * *